July 3, 1945.　　　　E. F. ROSSMAN　　　　2,379,750
SHOCK ABSORBER
Filed Sept. 22, 1943　　　2 Sheets-Sheet 1
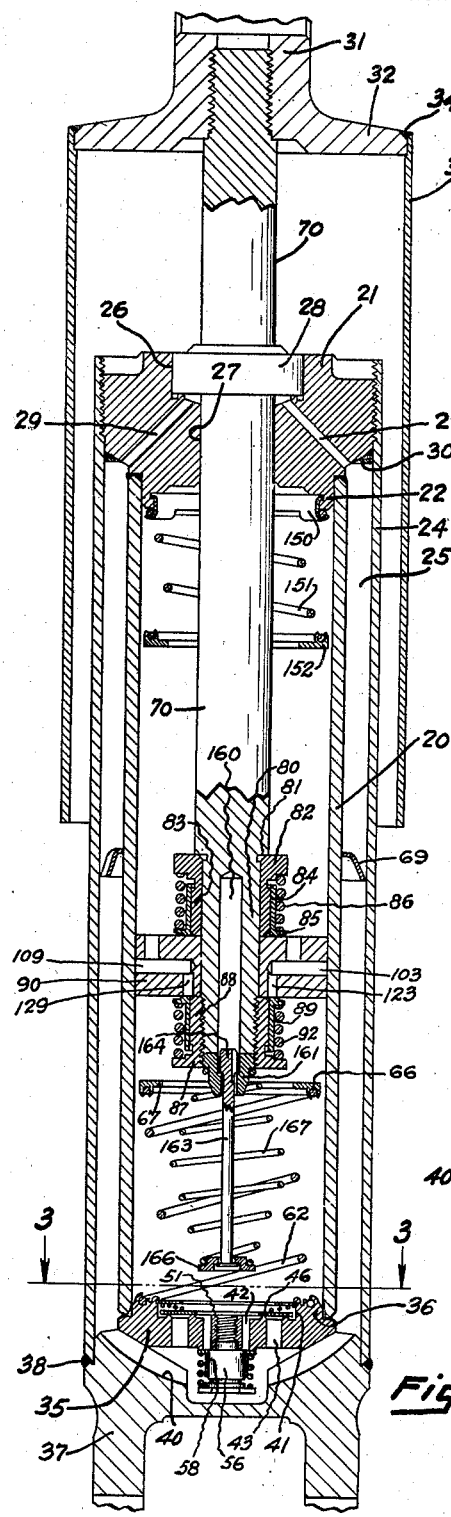
Fig. 1.
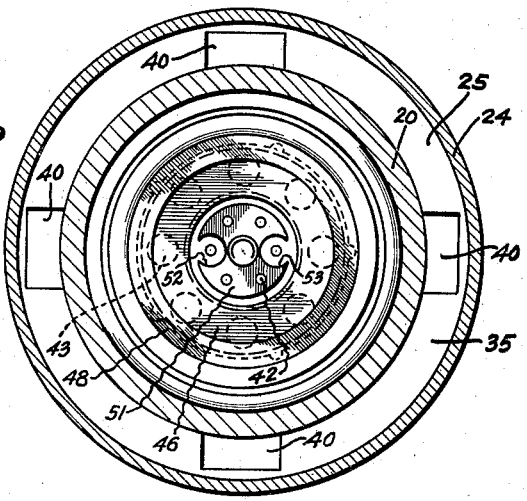
Fig. 4.
Fig. 3.
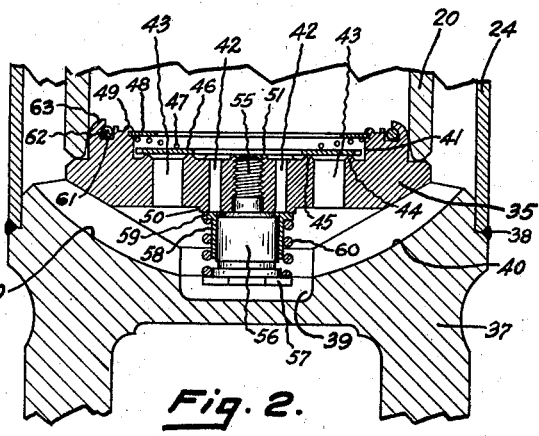
Fig. 2.
INVENTOR
EDWIN F. ROSSMAN
BY
HIS ATTORNEYS.

July 3, 1945. E. F. ROSSMAN 2,379,750
SHOCK ABSORBER
Filed Sept. 22, 1943 2 Sheets-Sheet 2

INVENTOR
EDWIN F. ROSSMAN
BY Spencer Hardman and John
HIS ATTORNEYS.

Patented July 3, 1945

2,379,750

UNITED STATES PATENT OFFICE 2,379,750

SHOCK ABSORBER

Edwin F. Rossman, Dayton, Ohio, assignor to General Motors Corporation, Detroit, Mich., a corporation of Delaware Application September 22, 1943, Serial No. 503,379

14 Claims. (Cl. 188—88)

This invention relates to improvements in hydraulic shock absorbers and particularly to the two-way direct-acting type of shock absorbers.

It is among the objects of the present invention to provide a hydraulic shock absorber adapted to control both the approaching and separating movements of two relatively movable members such as the frame and axle of a vehicle. The shock absorber is particularly adapted to provide a slight resistance to movements in either direction from its dead center or normal load position, and comparatively higher resistance while moving through a predetermined final portion of its range of movement in either direction.

A further object of the invention is to provide a hydraulic shock absorber having "compression" or approaching and "rebound" or separating movements, said shock absorber during its "compression stroke" from normal load position providing a low resistance to movements for a predetermined portion of such stroke and then a comparatively high resistance for the remaining and final portion of its compression stroke. When moving from normal load position through its rebound stroke, the shock absorber provides a comparatively low resistance to movement through a predetermined portion of this stroke and then through the final remaining portion of the rebound stroke it provides an increased resistance. This increased resistance may not necessarily be as high as the resistance offered during the final stage of the compression stroke.

Further objects and advantages of the present invention will be apparent from the following description, reference being had to the accompanying drawings wherein a preferred embodiment of the present invention is clearly shown.

In the drawings:

Fig. 1 is a sectional view taken longitudinally through the shock absorber. To illustrate the shock absorber completely this view is at half-size scale. All the remaining views of the drawings are made at full size scale.

Fig. 2 is a fragmentary, sectional view particularly illustrating the valve head or end member of the working cylinder.

Fig. 3 is a transverse and sectional view taken on the line 3—3 of Fig. 1.

Fig. 4 is a detail sectional view of the shut-off valve carried by the piston rod.

Figure 5:
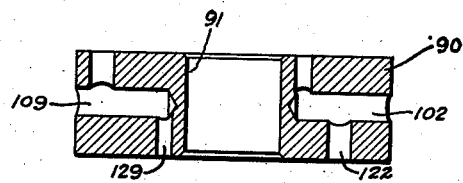
Fig. 5 is a sectional view of the piston taken along the lines 5—5 of Fig. 6.

Referring to the drawings, the working cylinder of the shock absorber is designated by the numeral 20. This cylinder is provided with a head or end member at each end, the upper end member being designated by the numeral 21. One end of this end member 21 is machined to provide an annular projection 22 which fits snugly into the one end of the cylinder and is attached to said cylinder by welding or any other suitable method. The outer diameter of the annular body portion of end member 21 is of comparatively greater diameter than the working cylinder 20 and is provided with threads for receiving the interiorly threaded end of the tubular member 24. Tubular member 24 as shown in Fig. 1 surrounds the cylinder 20 and, due to the difference in diameter of said cylinder and tubular member, an annular space 25 is provided forming the fluid reservoir. The outer surface of the end member 21 is recessed as at 26, this recess communicating and aligning with a central bore 27 through the head member. Recess 26 and bore 27 are concentric and coaxially align with the working cylinder 20. A packing gland 28 is received by the recess 26. Ducts 29 in the said member 21 provide communication between the bottom portion of the recess 26 and the reservoir 25. Any suitable type of packing 30 is provided in the reservoir 25 adjacent the annular point of engagement between the end member 21 and tubular member 24 to prevent fluid leaks through the screw threaded connection between said two members.

A piston rod 70 slidably extends through the packing gland 28 and the central bore 27 in the end member 21 into the interior of the cylinder 20. The outer end of this piston rod 70 has an attachment fixture 31 secured thereto in any suitable manner, this attachment fixture providing means for securing the movable member or piston of the shock absorber to one of the relatively movable members, as for instance the frame of a vehicle. This attachment fixture has an annular disc-like flange 32 which fits into a tubular member 33 of greater diameter than the tubular member 24 surrounding the working cylinder 20. Tube 33 may be attached to the attachment fixture 31 by welding as at 34. This tubular member 33 telescopically fits over the tubular member 24 a predetermined length, thereby providing a dust cover which substantially prevents dust from reaching the piston rod 60 which slides in the packing gland 28.

The lower end member 35 has an annular portion 36 extending into and fitting tightly in the cylinder 20. A portion of the lower surface of said end member 35 is seated upon the inner surface of the lower attachment fixture 37 by means of which this end of the shock absorber is attached to the other relatively movable member to be controlled, as for instance the axle of the vehicle. The outer diameter of this fixture 37 is such as to fit snugly into the tubular member 24 which is attached to the fixture by welding as at 38. A central recess 39 in the fixture 37 is in communication with the reservoir 25 through radial slots 40 cut in the inner end surface of the fixture 37.

The end member 35 has a central recess 41. The bottom surface of this recess is provided with valve seats and fluid passages as follows: a plurality of fluid passages 42 extend through the end member 35, these fluid passages being arranged in an annular row as shown in Fig. 3. Another group of fluid passages 43 of greater fluid flow capacity than the fluid passages 42 are arranged in an annular row outside the annular row of fluid passages 42. An annular ridge 44 is provided in the bottom wall surface of the recess 41, this annular ridge lying just outside the confines of the fluid flow passages 43 so as to encompass them. Another annular ridge 45, of lesser diameter than the annular ridge 44, lies just inside the confines of the annular row of fluid passages 43. Thus the concentric annular ridges 44 and 45 provide an annular space therebetween into which the one end of all the fluid passages 43 open. These two concentric annular ridges 44 and 45 being of substantially inverted V-shape cross section as shown in Fig. 2, provide valve seats for the ring-shaped intake valve 46 which is normally urged upon said annular concentric valve seats 44 and 45 by a spring 47 interposed between the valve 46 and a ring-shaped retainer washer 48 secured to the end member 35 by a spun-over edge 49. The outer diameter of the intake valve 46 is substantially less than the diameter of the recess 41, but still sufficient to engage the outer annular valve seat 44. Spaced humps in the outer periphery of the intake valve 46 maintain the valve in proper alignment so as to assure engagement of the valve 46 with the annular valve seats 44 and 45 and still maintain a proper fluid flow gap between the inner wall of the recess 41 and the outer edge of the valve 46.

The lower or outer ends of fluid flow passages 42 terminate in a flat surface of an annular extension 50 on the end member. A similar annular extension 51 is provided on the opposite, inside surface of the end member 35, the surface of extension 51 being substantially flush with the faces of the annular valve seats 44 and 45. The inner ends of fluid passages 42 terminate at this inner surface of the annular extension 51.

Reference to Fig. 3 shows that the surface of the annular extension 51 has two counterbores 52 and 53, each of these counterbores being substantially concentric with a fluid passage 42. This provides for a fluid flow orifice, as will later be described.

A central bore in the end member 35 is interiorly threaded to receive the threaded shank 55 of a stud having a main cylindrical shaped body portion 56 and a larger head 57. A sleeve valve 58 is slidably mounted upon the body portion 56 of the stud, this sleeve valve 58 having an outwardly extending, annular flange 59 which is urged into seating engagement with the surface of the annular extension 50 on the end member 35 by a spring 60 so that normally the outer ends of the fluid flow passages 42 are yieldably held closed by the flange 59 of this valve.

An annular groove 61 is provided in the inner surface of the end member 35, this annular groove receiving the one end convolution of a spring 62. A portion of the end member is spun over as at 63, forming a retaining lip which securely attaches the end convolution of the spring 62 to the end member 35. As shown in Fig. 1 the upper convolution of spring 62 is secured in a groove 66 provided in the ring-shaped valve 67, portions of the valve 67 being spun over to secure the upper end convolution of spring 62 to said valve. This spring 62 is of lesser diameter than the inner diameter of the cylinder 20 and is of such a length so as yieldably to suspend the valve 67 a predetermined distance from the end member 35. The function of valve 67 will be described detailedly hereinafter.

A cylindrical cup-shaped washer 69 is supported in the reservoir 25 a predetermined distance from the bottom end member 35, this washer 69 acting as a dash for preventing extreme fluid agitation in the reservoir 25 and still permit the escape of any air in said fluid from the reservoir through the ducts 29. Clearances in the washer 69 between the tubular member 24 and said washer permit any fluid leaking past the piston rod bearing 27 to return to the reservoir fluid supply via the ducts 29 in the head member 21.

The piston rod 70 extends into the interior of the cylinder 20, the inner end of said piston rod having a reduced diameter portion 80 providing an annular shoulder 81 spaced a predetermined distance from the end of the piston rod. A spacing collar 82 fits snugly over the reduced diameter portion 80 of the rod 70 and abuts the shoulder 81 on said rod. This spacing collar 82 has a reduced diameter portion 83 upon which is slidably mounted a valve 84 having an outwardly extending annular flange 85 which is urged upon the upper surface of the piston 90 by a spring 86 interposed between the head portion of the spacing collar 82 and the flange 85 of the valve 84. Valve 84 normally yieldably closes certain fluid flow passages to the piston, as will be described.

The piston 90 has a central bore 91 which snugly fits about the reduced diameter portion 80 of the piston rod. The piston is maintained in engagement with the inner end of the spacing collar 82 by another spacing collar 87 interiorly threaded to be screwed upon the threaded end of the reduced diameter piston rod portion 80. This spacing collar 87 has a reduced diameter body portion 88 upon which is slidably mounted the valve 89 having a flange 91 yieldably urged upon the lower surface of the piston by a spring 92 which is interposed between the flange 91 of the valve 89 and the enlarged head portion of the spacing collar 87. Like valve 84, this valve 89 normally yieldably closes certain fluid flow passages in the piston, as will be described.

Figure 6:
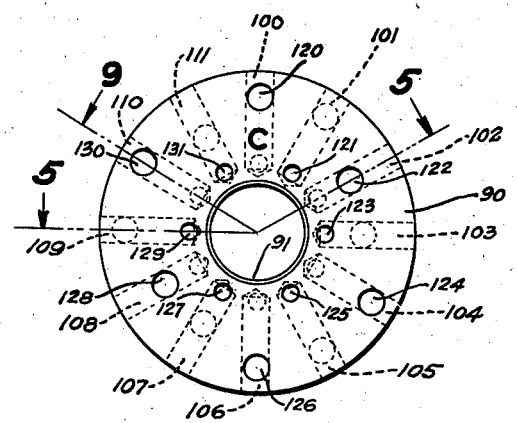
Fig. 6 is a view of the lower or "compression" side of the piston.

With particular reference to the figures on the second sheet of drawings, said figures including those numbered 5 to 10 inclusive, it will be seen that the piston is provided with a plurality of radial recesses extending from the outer annular surface of the piston short of the central bore 91. These radial recesses are substantially intermediate the end walls of the piston and, for purposes of description, are designated by the numerals 100, 101, 102, 103, 104, 105, 106, 107, 108, 109, 110 and 111. Certain other fluid flow passages lead from the opposite sides of the piston in communication with these radial recesses. The Figs. 5 and 6 illustrate particularly the fluid flow passages providing communication from the lower or compression surface of the piston with said radial recesses. The first group of such fluid flow passages are arranged in a circular row immediately about the piston rod. These passages are as follows: 121 communicates with radial recess 101; 123 communicates with recess 103; 125 with recess 105; 127 with recess 107; 129 with recess 109 and 131 with recess 111.

Two other fluid flow passages of greater transverse dimension and therefore greater fluid flow capacity than the group just referred to lead from the compression side surface of the piston 90 into certain radial ducts, these two fluid flow passages being diametrically opposite each other and at somewhat greater distance from the center of the piston rod than the annular row of fluid flow passages previously described and numbered 121 to 131 inclusive. One of these larger fluid flow passages is designated by the numeral 122 and communicates with recess 102. The other diametrically opposite fluid flow passage 128 communicates with the recess 108. Four more fluid flow passages of substantially the same fluid flow capacity as passages 122 and 128 provide communication between the lower compression surface of the piston 90 and certain radial recesses. These four fluid flow passages are arranged in an annular row and are spaced still a greater distance from the center of the piston rod than the fluid flow passages 122 and 128. One of these most outwardly positioned fluid passages is designated by the numeral 120 and communicates with radial recess 100, the second, 124, communicates with radial recess 104, the third passage 126 is diametrically opposite the passage 120 and it communicates with the radial recess 106. The fourth passage 130 diametrically opposite passage 124 communicates with radial recess 110.

Figure 9:
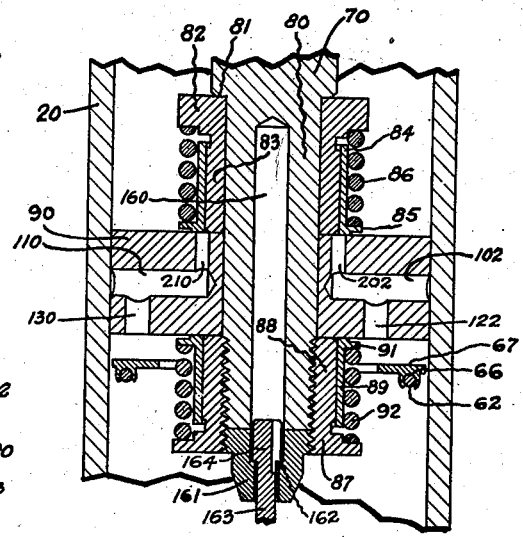
Fig. 9 is a detail sectional view particularly illustrating the piston assembly. The cross section of the piston was taken along the line 9—9 of Fig. 6.
Figure 10:
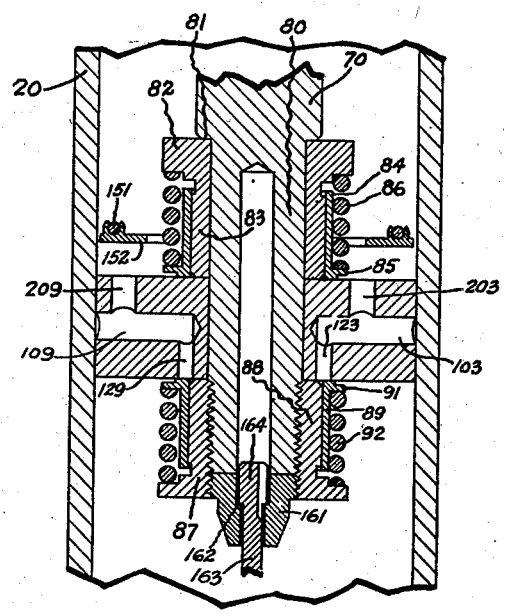
Fig. 10 is a view similar to Fig. 9, the section through the piston taken along the line and in the direction 10—10 of Fig. 7.

The spring loaded pressure relief valve 89 normally yieldably closes the fluid passages 121 to 131 inclusive, Fig. 10 showing the passages 123 and 129 of this group being closed by valve 89. When the piston reaches a predetermined point in its downward movement within the cylinder 20, it will engage the ring valve 67 yieldably supported within the cylinder by the spring 62, said ring valve then closing the fluid passages 120, 124, 126 and 130 in the piston and partially covering the fluid passages 122 and 128. This is clearly illustrated in the Fig. 9.

Figure 7:
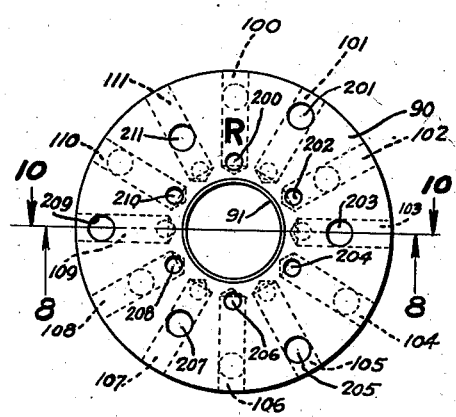
Fig. 7 is a similar view taken of the upper "rebound" side of the piston.
Figure 8:
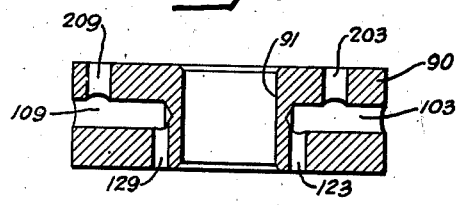
Fig. 8 is a sectional view of the piston taken along the line and in the direction 8—8 of Fig. 7.

Figs. 7 and 8 illustrate the piston and particularly its upper or rebound side and fluid passages. Here an annular row of fluid passages similar to the passages 121 to 131 inclusive are provided, these passages communicating with radial recesses alternate to the recess with which passages 121 to 131 communicate. Referring to Fig. 7, the passage 200 communicates with recess 100; the passages 202 with recess 102; passage 204 with recess 104; passage 206 with recess 106; passage 208 with recess 108 and passage 210 with recess 110. Three fluid flow passages similar to fluid flow passages 122 and 128 are provided on this side of the piston at a distance equal from the center as said passages 122 and 128, one of these passages being designated by the numeral 203 communicating with passage 103, the other 207 communicating with recess 107, and passage 211 communicating with recess 111. Three more passages similar to passages 120, 124, 126 and 130 on the opposite side of the piston are provided on this rebound side, the one designated by the numeral 201 communicating with recess 101; 205 communicating with recess 105, and 209 communicating with recess 109. The spring loaded fluid relief valve 84 normally yieldably maintains passages 200, 202, 204, 206, 208 and 210 closed as shown in Fig. 9. The upper end member 21 and particularly the portion thereof extending into the cylinder 20 has a collar 150 secured thereto in any suitable manner, this collar forming an anchorage for the upper end of a coil spring 151, the lower convolution or end of said spring being secured to the ring valve 152. This spring holds ring valve 152 yieldably a predetermined distance from the upper end member 21. When the piston moves upwardly it may engage this ring valve 152, and when it does, said valve will close the fluid passages 201, 205 and 209 completely and will partially close the fluid passages 203, 207 and 211 so as to reduce their fluid flow capacity.

The inner end of the piston rod 70 is centrally recessed as at 160. A collar 161 is threaded into the spacing collar 87 so as to abut the end of the piston rod 70. This collar 161 has a central bore of two different diameter portions, the portion adjacent the outer end of the collar being smaller in diameter than the inner portion of the bore, thus presenting an interior shoulder 162 within the collar. A spindle 163 extends loosely into and through the collar 161, the inner end of this spindle having an enlarged head portion 164 of slightly less diameter than the recess 160 in the piston rod so that the shoulder provided between the smaller body portion of the spindle 163 and the larger head portion 164 of said spindle engages the shoulder 162 which acts as a stop preventing removal of the spindle from the collar 161 when once assembled. This spindle 163 has a shut-off valve 166 loosely mounted thereon, the spun-over end of the spindle preventing removal of the valve therefrom. A coil spring 167 is interposed between the shut-off valve 166 and the collar 161 and yieldably maintains said collar in engagement with the spun-over end of the spindle. Valve 166 is movable to engage the end member 35 and particularly the portion 51 thereof in which fluid passages 42 terminate when the piston reaches a predetermined point in its downward, compression movement, as will detailedly be described.

As has been stated previously, the function of this shock absorber is to control the movements of two relatively movable members, particularly the frame and axle of a vehicle. The fixture member 31 to which the piston rod 70 is attached is anchored to the frame of the vehicle while fixture 37 to which the cylinder assembly is attached is anchored to the axle of the vehicle. Any relative movement between the frame and axle of the vehicle causes a relative movement between the piston assembly and the cylinder assembly of the shock absorber, thereby displacing fluid within the shock absorber. This fluid displacement is controlled by valve mechanism so that the shock absorber will offer resistance in accordance with the fluid flow thereby controlling the relative movements of the frame and axle of the vehicle.

Considering for purposes of description that the shock absorber as shown in Fig. 1 is in the normal load position and considering that the wheels of the vehicle strike an obstacle in the roadway, thrusting the axle upwardly, a movement of the cylinder assembly upwardly relatively to the piston will obtain. This is equivalent to a downward movement of the piston in the cylinder. As the piston moves downwardly in the cylinder 20 it will exert pressure upon the fluid therebeneath. Under these circumstances under the effect of spring 47 and with the aid of fluid pressure, valve 46 is urged upon its annular valve seats 44 and 45 thereby to prevent any fluid flow from the cylinder 20 through the valve passages 43 into the reservoir. The spring load on the pressure relief valve 58 is greater than the spring load upon the pressure relief valve 84 in the piston, thus said valve 84 will be actuated to become effective to establish a fluid flow through the piston before the valve 58 becomes effective to establish a fluid flow from the cylinder through passages 42 in the end member 35 into the reservoir. In response to the downward movement of the piston 90 and at a predetermined fluid pressure within the lower working chamber of the cylinder, valve 84 will be moved from its seat, the fluid pressure beneath the cylinder acting through the fluid passages 120, 122, 124, 126, 128 and 130 which, via their respective radial recesses 100, 102, 104, 106, 108 and 110 connect said fluid passages with the exhaust fluid passages 200, 202, 204, 206, 208 and 210 normally closed by the spring loaded valve 84. When the pressure reaches a predetermined value, this valve 84 will be lifted from engagement with the piston and thereby open the exhaust passages 200, 202, 204, 206, 208 and 210 to permit a restricted fluid flow therefrom into the upper working chamber of the cylinder. However, the cylinder chamber above the piston cannot receive all of the fluid displaced from the cylinder chamber beneath the piston, for the upper working chamber is of lesser fluid capacity than the lower working chamber due to the presence of the piston rod 70 which displaces fluid in this upper chamber. The fluid displaced by the piston rod 70 in the upper chamber will therefore cause excessive fluid under pressure in the lower cylinder chamber to move valve 58 from its seat on surface 51 of the end member 35 against the effect of spring 60, thereby establishing a pressure relieving flow from the cylinder through the fluid flow passages 42 past the valve 58 and through channels 40 into the reservoir 25. The restriction to the fluid flow from the lower cylinder chamber into the upper cylinder chamber by valve 84 and the restriction to the fluid flow from the lower cylinder chamber into the reservoir past valve 58 are of such a degree that the shock absorber will offer only a slight resistance to the initial downward movement of the piston in the cylinder. However, when the piston has moved downward a sufficient distance to place the shut-off valve 166 upon the valve seat 51 on the end member 35, fluid flow passages 42 will be completely shut off except, however, the two passages opening into the counterbores 52 and 53 in said valve seat surface 51. With the shut-off valve 166 upon the valve seat 51, four of the six fluid flow passages 42 are completely closed, the other two by virtue of the counterbores 52 and 53 permitting a restricted fluid flow against and past the valve 58 into the working cylinder. Thus after valve 166 is seated, the effective area of valve 58 is greatly reduced and therefore the fluid flow in the shock absorber is more highly restricted consequently the shock absorber will now offer a greater resistance to relatively approaching movements of the frame and axle of the vehicle. Continued movement of the piston downwardly will cause the spring 167 to maintain the valve 166 upon the seat 51 while the stem 163 slides upwardly into the recess 160 of the piston rod. When, in the downward movement of piston 90, it reaches a predetermined point, ring valve 67 will be engaged, this ring valve closing certain of the entrance fluid flow passages at the bottom or compression side of the piston while restricting others. The passages that are completely closed are numbered 120, 124, 126 and 130 while the passages which are partially restricted are the passages 122, and 128. By restricting passages 122 and 128 and completely closing the other passages 120, 124, 126 and 130 the effective volume of fluid acting upon the pressure relief valve 84, which controls the outlet end of all these passages at the upper compression side of the piston, will be greatly reduced, thus at the existing pressure the spring 86 will actuate the valve 84 increasingly to restrict the fluid flow and consequently the shock absorber will provide an increased resistance to further approaching movements of the vehicle frame and axle. This increased resistance will be maintained while the piston moves from the point of contact with the ring valve 67 throughout its final range to the extreme end of the compression stroke, or more specifically until the piston 90 reaches a predetermined limit in its downward stroke. Thus it may be seen that during the downward stroke of the piston three stages of resistances are provided. The first, from normal load position to a position in which valve 166 engages end member 35 which is a stage of minimum resistance, the second or intermediate stage where valve 166 actually engages seat 51 provides an increased resistance over that first offered by the shock absorber, and the third or final stage of resistance, which is the highest resistance and which is provided by the shock absorber as the piston moves from position of contact with valve 67 to its lowermost compression limit stroke.

When the frame and axle of the vehicle move to separate, the piston 90 is moved upwardly in the cylinder. This exerts a pressure upon the fluid in the upper working chamber of the cylinder above the piston, tending to force fluid from said chamber through the piston passages into the lower working chamber of the cylinder. The fluid in the upper chamber is not of sufficient capacity completely to fill the lower chamber due to the presence of the piston rod 70 in the upper chamber and therefore the intake valve 46 will be lifted from its annular seats 44 and 45 against the effect of spring 47 to establish a flow of fluid from the reservoir 25 through channels 40 and fluid flow passages 43 into the cylinder chamber beneath the piston. As the pressure is exerted upon the fluid in the upper chamber of the working cylinder 20, fluid will be urged through the passages 201, 203, 205, 207, 209 and 211 into the communicating radial recesses 101, 103, 105, 107, 109 and 111. From these radial recesses fluid will flow through the exit ports or passages 121, 123, 125, 127, 129 and 131 terminating in the bottom side of the piston and normally yieldably closed by the spring loaded pressure release valve 89. At a predetermined fluid pressure this pressure relief valve 89 will be moved against the effect of its spring 92 to permit a restricted flow of fluid from the exhaust ports mentioned, thereby establishing a controlled fluid flow from the upper cylinder chamber through the piston into the lower cylinder chamber. This causes the shock absorber to offer its first stage of rebound movement resistance, which resistance is comparatively light in accordance with the design of the spring loaded valve 89. Continuing to move upwardly, the piston 90 will, when it reaches a predetermined point, engage the ring valve 152 suspended at a predetermined distance from the top of the cylinder chamber by the spring 151. When ring valve 152 engages the piston the following fluid entrance passages 201, 205 and 209 will be completely closed, as is illustrated in Fig. 10. The entrance passages 203, 207 and 211 will be partially covered by the ring valve 152. The closing of some and partial covering of others of the entrance passages will substantially reduce the effective area of the spring loaded pressure relief valve 89 and consequently it will become effective at this point to increase its restriction to fluid flow from the upper cylinder chamber through the piston into the lower cylinder chamber. Thus as the piston moves from the point of contact with ring valve 152 to the extreme upper limit of the rebound stroke, fluid flow to the piston will be restricted to a greater degree than before and consequently the shock absorber during this stage of movement will offer an increased resistance to the separating movement of the frame and axle of the vehicle. From this it may be seen that the shock absorber on its rebound movement offers a predetermined low resistance to the separating or rebounding movement of the relatively movable members for a predetermined portion of this movement, and then for the final portion of this rebound movement the resistance offered by the shock absorber is substantially increased.

The aforegoing description clearly discloses applicant's shock absorber as being adapted to provide a 3-stage compression movement control and a 2-stage rebound movement control, the resistance offered by the shock absorber approaching the final stages of both movements being the highest, that is greater than resistances offered during the other intermediate or initial portions of its movement in the same direction.

While the embodiment of the present invention as herein disclosed, constitutes a preferred form, it is to be understood that other forms might be adopted, all coming within the scope of the claims which follow.

What is claimed is as follows:

1. A hydraulic shock abosrber comprising in combination, a cylinder having an orificed end member communicating with a fluid reservoir, fluid displacement means in said cylinder comprising a piston having a plurality of fluid transfer passages and a rod for reciprocating said piston; a fluid flow controlling device yieldably urged upon each side of the piston, each device normally yieldably closing one end of a group of said passages; means yieldably supported in the cylinder adjacent each end, said means being adapted to engage the side of the piston adjacent thereto to close some of the passages open on said side of the piston for reducing the effective volume of fluid acting upon the fluid flow controlling device yieldably urged upon the opposite side of the piston; and means for controlling fluid flow through the orificed end member into and from the reservoir.

2. A hydraulic shock absorber comprising in combination a cylinder having an orificed end member communicating with a fluid reservoir; a piston in said cylinder, said piston having a plurality of passages therethrough; an actuator for reciprocating said piston; means yieldably urged upon the opposite sides of the piston, each means normally closing one end of a group of said passages; and means for restricting the opposite open ends of each group of said passages when the piston reaches a predetermined point in its movement toward either end of the cylinder, said means being yieldably supported in the cylinder adjacent each end thereof; and means for controlling fluid flow through the orificed end member in either direction.

3. A hydraulic shock absorber comprising in combination, a cylinder, a piston in said cylinder, said piston having a plurality of through passages, a piston actuator; spring loaded means normally closing a different group of said passages at each side of the piston; spring suspended means in the cylinder adjacent each end thereof, each adapted to restrict the open end of the group of passages normally closed at the opposite end by the spring loaded means on the side of the piston opposite the suspended means whereby the effective volume of fluid acting upon said spring loaded means is reduced during a predetermined final range of piston movement toward said suspended means; and a valved end member for said cylinder, for controlling fluid flow into and from said cylinder.

4. A hydraulic shock absorber comprising in combination, a cylinder, a piston in said cylinder, said piston having a plurality of fluid transfer passages; a piston reciprocator; a spring loaded, pressure relief valve on each side of the piston, each valve normally closing certain of said piston passages but adapted to permit a restricted fluid flow through said certain piston passages in one direction in response to piston movement in the opposite direction respectively; a ring valve yieldably suspended in each end of the cylinder, and adapted to be engaged by the piston and predeterminately restrict fluid flow against the pressure relief valve on the side of the piston opposite the ring valve while the piston moves through a predetermined final portion of its range of movement; a fluid reservoir; and a valved end member provided between the cylinder and reservoir for controlling fluid flow between the cylinder and reservoir.

5. A hydraulic shock absorber comprising in combination, a cylinder; a closure member for each end of the cylinder; a piston in said cylinder, said piston having a plurality of passages for the transfer of fluid from one side of the piston to the other; a piston rod slidably extending through the one closure member; a pressure relief valve on each side of the piston, one controlling fluid flow in one direction through certain of said piston passages, the other controlling the flow in the opposite direction through the other of said passages, said fluid flow being established in response to reciprocation of the piston in the cylinder; a ring plate in the cylinder on each side of the piston; a spring secured to each closure member and to the ring plate adjacent thereto for supporting the ring plate, each of which is adapted to engage the piston when it is moved into proper position in the cylinder for closing certain of the fluid passages in the piston whereby the effective volume of fluid directed against the pressure relief valve on the side of the piston opposite the active ring plate is predeterminately reduced; and valved ducts in the other closure member for controlling fluid flow into and from the adjacent cylinder chamber.

6. A hydraulic shock absorber comprising in combination, a fluid reservoir; a cylinder having an orificed end member providing communication between the reservoir and cylinder; fluid displacement means in said cylinder comprising a piston and a piston rod, said piston having a plurality of fluid passages therethrough; a spring loaded pressure relief valve on each side of the piston each valve normally closing the ends of half of the piston passages; a spring suspended valve adjacent each end of the cylinder adapted to be engaged by the piston when moved in one direction or the other for closing some of the piston passages normally closed by the pressure relief valve on the opposite side of the piston; a valve on the end member for permitting fluid to flow substantially freely from the reservoir through certain orifices in said end member into the cylinder as the piston moves away from said end member; and a spring loaded pressure relief valve normally closing the other orifices in said end member and adapted to permit a restricted fluid flow from said cylinder into the reservoir as the piston is moved toward said end member.

7. A hydraulic shock absorber comprising in combination, a fluid reservoir; a cylinder having an end member providing fluid passages connecting the reservoir and cylinder; a piston in said cylinder having a plurality of fluid passages therethrough; a rod for reciprocating said piston; pressure relief valves for controlling the flow of fluid through the piston passages as the piston is reciprocated; control valves suspended in the cylinder for restricting certain of the piston passages as the piston is moved through a final portion of its range of movement in either direction; a valve on said end member for permitting a substantially unrestricted fluid flow from the reservoir into the cylinder as the piston moves away from said end member; and another valve on said end member for permitting a restricted fluid flow from the cylinder into the reservoir as the piston moves toward said end member.

8. A hydraulic shock absorber comprising in combination, a fluid reservoir; a cylinder having an end member providing fluid passages connecting the reservoir and cylinder; a piston in said cylinder having a plurality of fluid passages therethrough; a rod for reciprocating said piston; pressure relief valves for controlling the flow of fluid through the piston passages as the piston is reciprocated; control valves suspended in the cylinder for restricting certain of the piston passages as the piston is moved through a final portion of its range of movement in either direction; a check valve yieldably urged upon said end member normally to close certain of its fluid passages but adapted, in response to piston movement in one direction, to establish a substantially unrestricted fluid flow from the reservoir into the cylinder; and a spring loaded pressure relief valve on said end member, normally closing the other of the fluid passages in said end member and adapted to establish a restricted fluid flow from the cylinder into the reservoir as the piston is operated in the other direction.

9. A shock absorber in accordance with claim 8, in which, however, there is provided a valve, carried by the piston rod and adapted to render the pressure relief valve on the end member substantially ineffective when the piston is moved to a predetermined point relative to said end member and while the piston is moving the remaining portion of its range of movement toward said end member.

10. A shock absorber in accordance with claim 8, differing, however, in that a valve is yieldably carried by the piston rod for engaging the end member at a predetermined point in the movement of the piston toward said end member whereby substantially to close the fluid passages normally closed by the pressure relief valve on said member and thereby rendering said pressure relief valve substantially ineffective during the final portion of the piston movement toward said end member.

11. A shock absorber in accordance with claim 8, differing, however, in that a spring loaded valve is yieldably supported by the piston rod, said valve being adapted to engage the end member when the piston has been moved into a predetermined position relatively thereto, for reducing the effective area of the fluid passages in the end member, normally-closed by the pressure relief valve on said member, during the remaining portion of the range of piston movement toward said end member.

12. A hydraulic shock absorber comprising in combination, a fluid reservoir; a cylinder having an end member provided with a plurality of fluid passages connecting the reservoir with the cylinder; fluid displacement means in said cylinder comprising a piston and a rod for reciprocating it, said piston having a plurality of fluid passages therethrough; fluid flow control means yieldably urged upon each side of the piston each means normally closing one half of the piston passages respectively; ring valves yieldably suspended in the cylinder at predetermined positions on each side of the piston and adapted to engage the piston and restrict certain fluid passages therein while the piston moves through a final portion of its range of movement in either direction whereby a lesser volume of fluid is directed against the respective fluid flow control means to establish restricted fluid flows therethrough; a valve on the cylinder side of the end member, yieldably closing certain of the fluid passages therein; a valve on the reservoir side of the end member yieldably closing the other of the fluid passages therein; and a valve supported by the piston rod for closing certain of said other fluid passages in the end member while the piston is moved through a predetermined final portion of its range of movement toward said end member.

13. A hydraulic shock absorber comprising in combination, a fluid reservoir; a cylinder having an end member providing fluid passages connecting the reservoir and cylinder; a piston in said cylinder having a plurality of fluid passages therethrough; a rod for reciprocating said piston; pressure relief valves for controlling the flow of fluid through the piston passages as the piston is reciprocated; control valves suspended in the cylinder for restricting certain of the piston passages as the piston is moved through a final portion of its range of movement in either direction; two oppositely acting spring loaded valves on the end member each normally closing certain of the fluid passages in said member; a stem telescopically supported in the piston rod; a valve at the outer end of said stem; and a spring interposed between the valve and piston rod, said spring urging the valve upon the end member to close some of the fluid passages, normally closed by one of the spring loaded valves on the end member, only while the piston is actuated through a predetermined final portion of its range of movement toward said end member.

14. A hydraulic shock absorber comprising in combination, a cylinder; a one-piece piston in said cylinder, said piston having a plurality of fluid flow passages therethrough; a rod attached to the piston for actuating it; a spring loaded valve normally, yieldably urged against each side of the piston, each valve closing the one end of alternate piston passages; and means independent of but engageable by the piston as it reaches a predetermined point in its travel in either direction, for restricting the normally open ends of certain of said alternate fluid flow passages whose opposite ends are normally closed by the spring loaded valve engaging the side of the piston opposite said means.

EDWIN F. ROSSMAN.